United States Patent Office 2,750,425
Patented June 12, 1956

2,750,425

1,2,3,4,4a,9,10,10a- OCTAHYDRO -7,9- DIHYDROXY-1-HYDROXYMETHYL-1,4a,-DIMETHYLPHENAN-THRENE AND PROCESS

Lee A. Subluskey, Wilmington, Del., assignor to Hercules Powder Company, Wilmington, Del., a corporation of Delaware No Drawing. Application April 27, 1955,
Serial No. 504,368

2 Claims. (Cl. 260—619)

The present invention relates to a novel and useful compound obtainable by the reduction by means of an alkali metal aluminum hydride of the methyl ester of 1,2,3,4,-4a,9,10,10a - octahydro - 7-hydroxy-1,4a-dimethyl-9-oxophenanthrene-1-carboxylic acid. It further relates to a process of preparing the compound.

The methyl ester of 1,2,3,4,4a,9,10,10a-octahydro-7-hydroxy - 1,4a - dimethyl-9-oxophenanthrene-1-carboxylic acid is a recently discovered compound and is described in copending application Serial No. 344,471, filed March 24, 1953, by P. F. Ritchie. In accordance with the present invention, it has been found that this methyl ester can be converted by reduction with an alkali metal aluminum hydride into the novel compound 1,2,3,4,4a,9,10,10a-octahydro - 7,9-dihydroxy-1-hydroxymethyl-1,4a-dimethylphenanthrene, the structure of which is as follows:

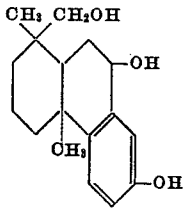

The following examples are presented to describe the compounds and to illustrate the method of preparation. All parts and percentages are by weight unless otherwise specified.

Example 1

Into a reaction vessel there was placed a mixture of 0.85 part of lithium aluminum hydride and 144 parts of ethyl ether. To this mixture there was added with stirring at room temperature a solution composed of 3.5 parts of methyl ester of 1,2,3,4,4a,9,10,10a-octahydro-7-hydroxy - 1,4a - dimethyl-9-oxophenanthrene-1-carboxylic acid dissolved in 72 parts of ethyl ether. Stirring was continued for 72 hours. At the end of this time, excess lithium aluminum hydride was decomposed by adding 10 parts of ethyl acetate following which 300 parts of dilute hydrochloric acid was added to decompose the lithium aluminum complex. After stirring for an additional two hours, the reaction mixture was allowed to stand and separate into two phases. The organic phase was then taken up in methylene chloride and washed with water until neutral. Drying and evaporation of the organic phase yielded a crude crystalline product. The crude product was next recrystallized from methanol to give 1.3 parts of 1,2,3,4,4a,9,10,10a-octahydro-7,9-dihydroxy-1-hydroxymethyl-1,4a-dimethylphenanthrene; M. P. 222° C.;

$\lambda_{\text{alc.}}^{\text{max.}}$ KOH 243 m$\mu$ ($\alpha$=38.5), 302.5 m$\mu$ ($\alpha$=9.5)

Analysis.—Calculated for $C_{17}H_{24}O_3$: C, 73.87; H, 8.75. Found: C, 74.12, 74,13; H, 9.11, 9.17.

Example 2

Five parts of the methyl ester of 1,2,3,4,4a,9,10,10a-octahydro - 7-hydroxy-1,4a-dimethyl-9-oxophenanthrene-1-carboxylic acid was added with stirring to a mixture of 3 parts of lithium aluminum hydride and 216 parts of dry tetrahydrofuran. Stirring was continued for 48 hours at room temperature at which time the reaction mixture was heated to reflux for an additional 5 hours. The reaction mixture was then treated by the procedure described in Example 1 to yield 3.5 parts of crude crystalline product. Upon recrystallization of this crude product from methanol there was obtained 2.6 parts of 1,2,3,4,4a,9,10,10a - octahydro - 7,9-dihydroxy-1-hydroxymethyl-1,4a-dimethylphenanthrene, M. P. 222° C.

As is evidenced by its name, the compound of the invention possesses a phenolic hydroxyl group and two alcoholic hydroxy groups. By virtue of this interesting and novel structure, it finds a variety of uses in diverse arts.

The compound is useful, for example, as a reactive component of phenol-aldehyde type synthetic resins or as a polyhydric alcohol for the preparation of linear polyesters. In the latter use, the compound is capable of lengthening the shelf and pot lives of the polyester without appreciable sacrifice in curing properties. To illustrate, a conventional polyester is prepared by esterifying propylene glycol with fumaric acid and phthalic anhydride in the ratio of 2 moles of glycol to 1 mole of each acid. This polyester, when blended with styrene in the ratio of 2 parts of polyester to 1 part of styrene by weight, has shelf and pot lives 20% shorter than a similar blend in which 10% by weight of the propylene glycol is replaced by a stoichiometrically equivalent amount of the compound of the invention although curing rates are nearly the same.

The compound is also useful as a dye intermediate, as an antioxidant for industrial and food uses, and as an intermediate in the manufacture of plasticizers for synthetic resins.

The compound of the invention can be esterified by reacting it with an acyl anhydride or an acyl halide as for example acetic anhydride, propionic anhydride, phthalic anhydride, ketene, acetyl chloride, benzoyl chloride, etc. Thus, it is possible to produce any aliphatic, cycloaliphatic, arylaliphatic or aromatic acid ester of this important new compound. Its esters with monobasic carboxylic acids are useful as plasticizers, particularly for cellulose esters and ethers.

The method of preparing the compound according to the invention comprises contacting the starting ester with an alkali metal aluminum hydride in a vehicle which is a solvent for the ester. This reduction is generally carried out in solution and any inert organic solvent may be used as a medium for the reaction provided that it is a solvent for either one or both of the reactants. Suitable solvents that can be used are diethyl ether, di-n-butyl ether, dioxane, tetrahydrofuran, diethyl Carbitol, benzene, hexane, toluene, etc. The reaction should be carried out under anhydrous conditions in order to avoid hydrolysis of the hydride and reduction in the yields thereby. Any alkali metal aluminum hydride such as lithium and sodium aluminum hydrides may be used for the reduction of the ester but lithium aluminum hydride is preferred. The amount of alkali metal aluminum hydride is preferably within the range of from about 0.5 to about 10 moles per mole of ester and, more preferably, is from about 1 to about 5 moles per mole of ester. In general, the reaction is carried out at a temperature of from about 0–50° C. and preferably at a temperature of from about 15° C. to about 35° C.

The alkali metal aluminum complex which is formed as an intermediate in the reaction is hydrolyzed by the addition of water, an acid or a base. Suitable acids for this purpose are the mineral acids, such as sulfuric acid, phosphoric acids, etc. but an alkali metal hydroxide such as sodium hydroxide, potassium hydroxide, etc. may be used with equivalent results. The concentration of the hydrolytic agent may be varied over a wide range since water alone can be used but, in general, if an acid or base is used, the concentration will be within the range of from about 5% to about 25% by weight of the ester. The hydrolysis takes place readily at room temperature; elevated temperatures are not required but may be used.

The method by which the compound of the invention is separated from the reaction mixture will be dependent upon the type of solvent used for carrying out the reaction. If a water-immiscible solvent is used for the reduction reaction, in which solvent the compound is soluble, the compound will then be present in the organic phase and can be separated from that phase by removal of the solvent. It may also be separated from the reaction mixture by extraction with a suitable water-immiscible solvent such as, for example, ethyl benzene, toluene, hexane, etc. It is a crystalline solid and can be purified by crystallization procedures.

What I claim and desire to protect by Letters Patent is:

1. 1,2,3,4,4a,9,10,10a - octahydro - 7,9 - dihydroxy - 1-hydroxymethyl-1,4a-dimethylphenanthrene.

2. The process of preparing the compound of claim 1 which comprises reducing the methyl ester of 1,2,3,4,4a,-9,10,10a - octahydro - 7 - hydroxy - 1,4a-dimethyl-9-oxo-phenanthrene-1-carboxylic acid with an alkali metal aluminum hydride.

References Cited in the file of this patent

UNITED STATES PATENTS

| | | |
|---|---|---|
| 2,504,612 | Zeiss | Apr. 18, 1950 |
| 2,656,343 | Ritchie | Oct. 20, 1953 |
| 2,722,532 | Arth et al. | Nov. 1, 1955 |